United States Patent [19]
Wollersheim

[11] Patent Number: 5,261,214
[45] Date of Patent: Nov. 16, 1993

[54] LAWN MOWER BAIL PIVOT STOP AND CABLE ANCHOR

[75] Inventor: William A. Wollersheim, Plymouth, Wis.

[73] Assignee: The Toro Company, Minneapolis, Minn.

[21] Appl. No.: 933,149

[22] Filed: Aug. 21, 1992

[51] Int. Cl.⁵ .............................. A01D 69/00
[52] U.S. Cl. .................... 56/11.3; 56/11.4; 56/11.7; 56/DIG. 18
[58] Field of Search ............ 56/11.2, 11.3, 11.7, 56/11.4, DIG. 18; 180/19.2, 19.3

[56] References Cited

U.S. PATENT DOCUMENTS

| | | | |
|---|---|---|---|
| 4,430,848 | 2/1984 | Wistrom | 56/11.3 |
| 4,455,811 | 6/1984 | Beugelsdyk | 56/10.8 |
| 4,704,847 | 11/1987 | Greider et al. | 56/10.5 |
| 4,805,386 | 2/1989 | Urban | 56/10.8 |
| 4,882,897 | 11/1989 | Oshima et al. | 56/11.3 |
| 5,088,273 | 2/1992 | Braun et al. | 56/10.5 |
| 5,195,307 | 3/1993 | Thorud et al. | 56/11.3 |

OTHER PUBLICATIONS

Wescon MZR Control Cable information sheet, form No. B5-4, (undated).
Lawn-Boy L21ZSM Owners Manual, part No. 614405 (1991).

Primary Examiner—Mark Rosenbaum
Assistant Examiner—John M. Husar
Attorney, Agent, or Firm—Donald S. Trevarthen; James R. Hakomaki

[57] ABSTRACT

A walk behind lawn mower operating system. The system comprises a handlebar onto which control bails with ends are pivotally attached, with the control bails being operatively connected to propulsion and blade brake systems, respectively. The control bails are arranged on the handlebar such that they pivot away from the handlebar in opposite directions. The control bails' cross-sectional dimensions are essentially identical. Each of the control bail's movement is limited by a bail pivot stop. Each bail pivot stop is removably attached to a control bail end so that it pivots with the control bail and restricts the pivoting movement by impinging upon the handlebar with an integrally formed stop. In the preferred embodiment, where the control bails pivot away from the handlebar in opposite directions, the control bail stops are located at either side of the handlebar.

6 Claims, 5 Drawing Sheets

LAWN MOWER BAIL PIVOT STOP AND CABLE ANCHOR

TECHNICAL FIELD

This invention pertains to lawn mower controls. Specifically, this invention pertains to a lawn mower bail pivot stop and cable anchor.

BACKGROUND OF THE INVENTION

Power lawn mowers typically incorporate one or more controls for controlling various operating systems on the lawn mower. Among these controls are the engine speed control, engine on/off control, engine choke control, mower propulsion control, and a blade brake control. These controls control the various operating systems on the mower such as the throttle valve, ignition system, choke valve, mower propulsion system and the blade brake. This invention centers on the propulsion and blade brake controls. Specifically, this invention centers on bail pivot stops which limit the pivoting motion of propulsion and blade brake control bails. This invention also centers on the means for connecting control cables to the pivoting control bails.

Lawn mower propulsion controls are utilized on lawn mowers that are "self-propelled." "Self-propelled" mowers incorporate a power transmission system which transmits power from the engine to the mower wheels to propel the mower. The propulsion control is typically located on the handlebar assembly of the lawn mower for ease of operator access. The propulsion control allows the operator to start or stop the transmission of power from the engine to the wheels. Some propulsion controls also allow the operator to choose a propulsion speed by changing gear ratios within the power transmission system. Furthermore, the operator can usually change the propulsion speed of the mower by varying the engine speed control which is also typically mounted on the handlebar assembly.

Typically, the propulsion control is a generally U-shaped bail that is pivotally connected to the handlebar assembly. The propulsion control bail is usually connected to the mower propulsion transmission by a cable or rod. The transmission and the bail are typically biased to a disengaged position. The bail typically incorporates some kind of stop which limits its pivotal movement resulting from the biasing force. The bail also typically incorporates a means for connecting the cable or rod to the bail so that the cable or rod moves with the bail as it pivots and, thus, transmits motion to the propulsion transmission engagement system.

Blade brake controls are widely used on walk behind power lawn mowers. Blade brakes are designed to stop the cutting blade's rotation within a few seconds after the operator releases the blade brake control, which is typically located on the mower handlebar assembly. One type of blade brake system incorporates a clutch between the engine and the blade wherein the clutch includes a brake that stops the rotation of the blade when the clutch disconnects the blade from the engine. This blade brake system is known as a blade brake control (BBC). Another type of blade brake system incorporates a brake on the engine flywheel that stops the engine and the blade, the blade being bolted directly to the engine crankshaft in this type of system. This system is known as a "zone" type blade brake. In both the BBC and zone systems, the operator typically stops the rotating blade by releasing a control bail which is connected to the BBC or zone brake by a cable or rod. The control bail is typically pivotally connected to the handle. The BBC and zone systems are biased to the braking mode and, as a result, the control bails are biased to the disengaged positions. The control bails typically incorporate stops that limit the movement of the bails to the biased "disengaged" position. The control bails also typically incorporate means for connecting the cable or rod to the bail.

One prior art control bail pivot stop is disclosed in U.S. Pat. No. 4,430,848 issued to Wistrom on Feb. 14, 1984. In Wistrom, the blade brake clutch (BBC) is controlled by the control bail 20. The BBC is biased to a disengaged position by spring 3. Control bail 20 is also biased to the far forward position as shown in FIG. 1 of Wistrom by the spring 3 and cable 14. Bracket 30 acts as a stop that limits the forward pivoting motion of bail 20. Cable 14 is connected to bail 20 by a hook like terminal end of cable 14 which hooks into a hole located in a swaged portion of bail 20. Bracket 30 is fastened to handlebar 16a by bolts 33.

Another prior art control bail pivot stop is disclosed in U.S. Pat. No. 5,088,273 issued to Braun et al on Feb. 18, 1992. In Braun, pivoting control bail 20 is connected to a blade brake, a clutch, or an ignition shut-off (none shown). The pivoting control bail 20 is biased to a disengaged position, where the bail is down and away from the handle, as shown in FIGS. 1 and 2 of Braun. Stop tab 23, which is attached to the handlebar 16, limits the downward pivoting motion of control bail 20. Braun does not disclose how bale 20 is connected to the blade brake, the clutch, or the ignition shut-off. The stop tab 23 appears to be welded to the handlebar 16.

Another prior art control bail pivot stop is disclosed in the Wescon MZR Control Cable information sheet, form number B5-4, dated August 1987. In this prior art system, the pivoting control bail pivot stop is a formed sheet metal piece that is attached to the pivoting control bail. The cable connecting the pivoting control bail to the mower operating system, presumably a blade brake or a mower propulsion system, is connected to the pivoting control bail by a hook like terminal in the cable that hooks into a hole located in a swaged portion of the pivoting control bail.

Another prior art control bail pivot stop is disclosed in the Lawn-Boy L21ZSM Owner's Manual, part number 614405, copyright 1991 to Lawn-Boy Inc. The Lawn-Boy self propelled control bail as shown on page 8, FIGS. 28 and 29, and on page 26, is pivotally connected to the mower handlebar and is also connected to the lawn mower transmission by a cable. The propulsion system and the propulsion control bail are biased to a disengaged position where the operator grip portion of the propulsion control bail has rotated away from the handlebar assembly, as shown in FIG. 29. The propulsion control bail incorporates an integral formed portion that acts as a pivot stop when the integral formed portion engages the mower handlebar assembly as the operator grip portion of the propulsion control bail rotates down and away from the handlebar assembly. The cable connecting the propulsion control bail and the mower transmission connects to the control bail on a formed hook that is welded to the propulsion control bail as shown on page 26.

The LBL21ZSM owner's manual also discloses another prior art control bail pivot stop. The Lawn-Boy mower depicted in this manual includes a zone brake pivoting control bail, as shown on pages 8 and 9, FIGS. 25, 26, 28, 29 and 30, and on page 26, of the manual. The zone brake pivoting control bail is pivotally connected to the mower handlebar and is also connected, by a cable, to the mower's zone brake which is mounted adjacent to the mower engine flywheel braking surface. The mower zone brake and the zone brake pivoting control bail are biased to a braked position where the control bail is pivoted to its forward most position as shown on page 9, FIG. 30. The zone brake control bail engages a ridge in the throttle case in its forward position. The throttle case ridge acts as a stop for the forward pivoting motion of the zone brake pivoting control bail, which pivots about an axis that runs through the throttle case. The cable connecting the zone brake and the zone brake pivoting control bail incorporates an eyelet type terminal that connects to the control bail at a hook that is formed integral with the control bail as shown on page 26.

The present invention offers an alternate bail pivot stop means and cable anchoring system. In particular, a preferred pivoting control bail pivot stop and cable anchor system according to the present invention incorporates a lawn mower with a handle, a pivoting control bail pivotally connected to the handle, a mower operating system, a member, and means for mounting the member on the pivoting control bail wherein the member is mounted on the pivoting control bail by the mounting means and wherein the member is operatively connected to the mower operating system and wherein the member limits the pivoting motion of the pivoting control bail when the member engages the handle.

SUMMARY OF THE INVENTION

Accordingly, the present invention includes an improved lawn mower bail pivot control stop and cable anchor.

Specifically, this invention includes, in a walk behind lawn mower with a handle, a pivoting control bail pivotally connected to the handle, and a mower operating system, a bail pivot stop including a member and means for mounting the member on the pivoting control bail wherein the member is mounted on the pivoting control bail by the mounting means and wherein the member is operatively connected to the mower operating system and wherein the member limits the pivoting motion of the pivoting control bail when the member engages the handle.

Another embodiment of this invention could include an operating system including a blade brake.

Another embodiment of this invention could include an operating system including a mower propulsion system.

Another embodiment of this invention could include a mounting means that includes a generally U-shaped channel in the member which is configured to receive the pivoting control bail in s snap fit.

BRIEF DESCRIPTION OF THE DRAWING

The invention will be further described with reference to the appended Drawing, wherein.

DETAILED DESCRIPTION OF A PREFERRED EMBODIMENT

Figure 1:
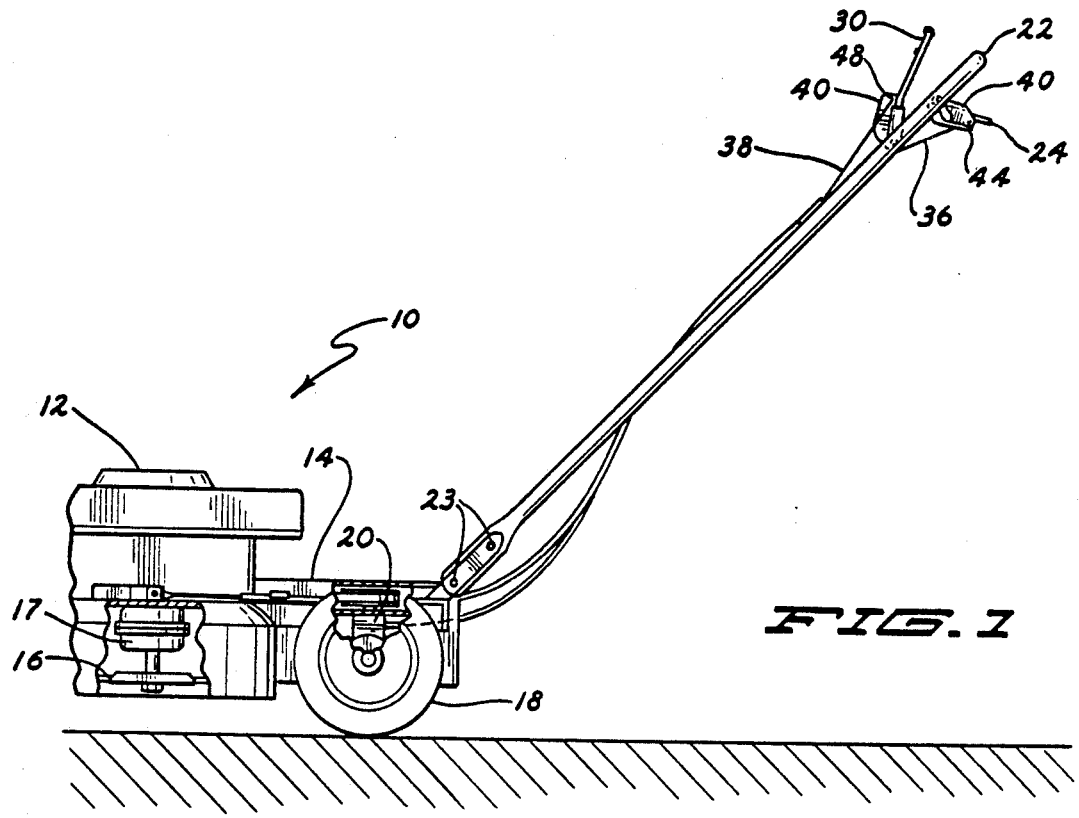
FIG. 1 is a side elevational view of a lawn mower with a blade brake pivoting control bail, a propulsion pivoting control bail, a blade brake clutch, and a propulsion system according to the preferred embodiment of the present invention.

In the drawing, wherein like reference numerals designate like parts and assemblies throughout the several views, FIG. 1 shows a preferred walk-behind rotary lawn mower 10 with an engine 12 which is typically powered by gasoline. The engine 12 mounts on a deck 14 and the engine output shaft (not shown) is operatively connected to the blade 16 via one of the mower operating systems, a blade brake clutch 17, so that power is transmitted from the engine 12 to the blade 16. Wheels 18 are mounted to the deck 14. Another of the mower operating systems, the transmission 20, transmits power from the engine 12 to the wheels 18, thus propelling the mower 10 over the ground. Handlebar 22 is operatively coupled to the deck 14 at points 23. Other mower operating systems not shown are the throttle valve, the ignition system, and the choke valve.

Figure 2:
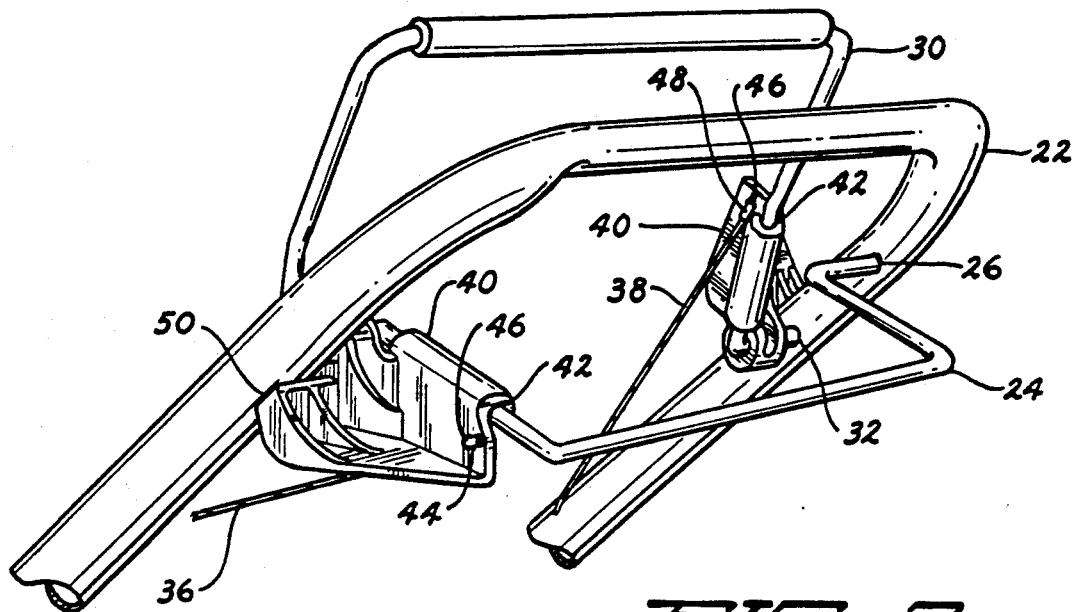
FIG. 2 is a partial perspective view of the handlebar assembly of the preferred lawn mower of FIG. 1 with the pivoting control bails in the biased position.
Figure 3:
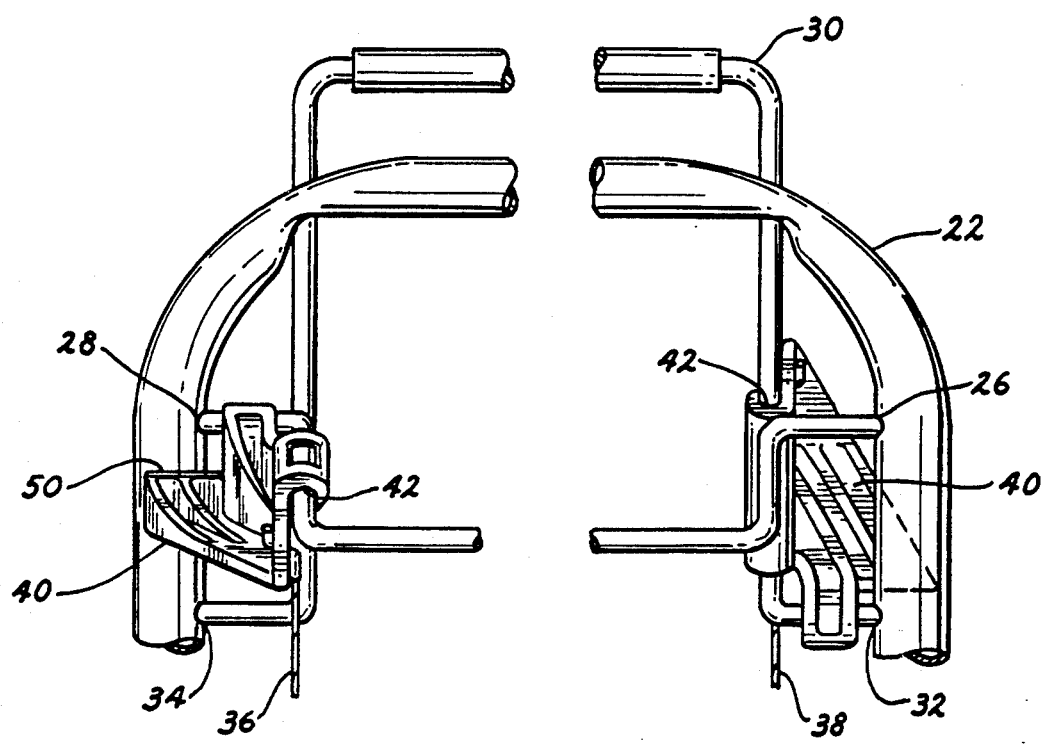
FIG. 3 is a partial bottom plan view of the handlebar assembly of the preferred lawn mower of FIG. 1.

FIGS. 2 and 3 show the lawn mower handlebar 22. Pivoting propulsion control bail 24 is pivotally attached to handlebar 22 at points 26 and 28. Pivoting propulsion control bail 24 has ends sized to fit within holes, in the handlebar 22, at points 26 and 28, about which the pivoting control bail 24 pivots. Pivoting blade brake control bail 30 is pivotally connected to the handlebar 22 at points 32 and 34. Pivoting blade brake control bail 30 has ends sized to fit within holes in the handlebar 22 at points 32 and 34, about which the control bail 30 pivots. Pivoting propulsion control bail 24 is connected to another mower operating system, the mower transmission 20 (FIG. 1), by cable 36. Pivoting blade brake control bail 30 is connected to the blade brake clutch 17 of FIG. 1 or the zone brake 19 of FIG. 14 by cable 38.

Figure 8:
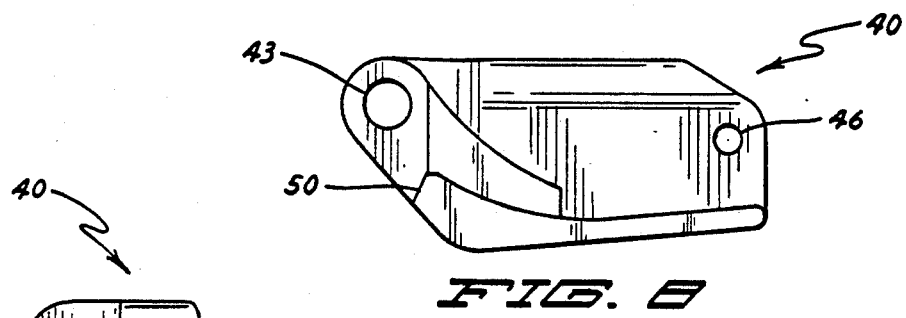
FIG. 8 is a right side elevational view of the bail pivot stop and cable anchor according to the preferred embodiment of the present invention.
Figure 10:
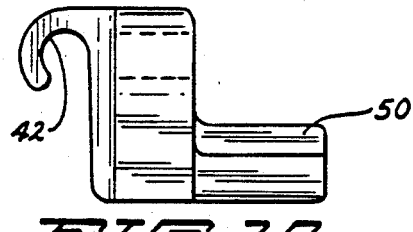
FIG. 10 is a rear elevational view of the preferred bail pivot stop and cable anchor of FIG. 8.
Figure 11:
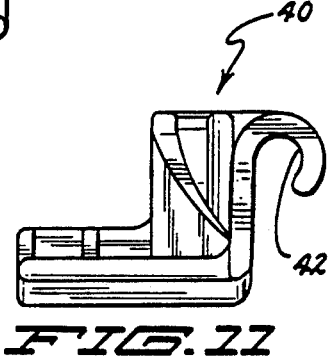
FIG. 11 is a front elevational view of the preferred bail pivot stop and cable anchor of FIG. 8.
Figure 12:
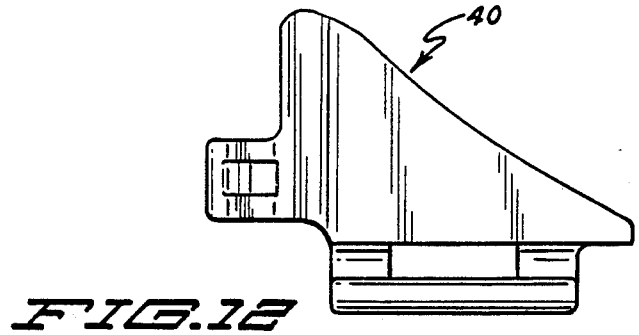
FIG. 12 is bottom plan view of the preferred bail pivot stop and cable anchor of FIG. 8.
Figure 13:
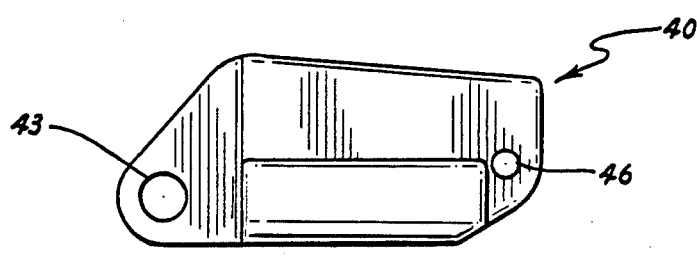
FIG. 13 is a left side elevational view of the preferred bail pivot stop and cable anchor FIG. 8.

Bail pivots stops 40 are mounted to the pivoting propulsion control bail 24 and the pivoting blade brake control bail 30 by a snap fit accomplished by the interfitting of a generally U-shaped channel 42 in the bail pivot stop 40 and the relatively oversized mating control bail surfaces of the control bails 24 and 30. The bail pivot stop 40 snaps onto the pivoting control bails 24 and 30 so that the base of the U-shaped channel 42 is loaded in compression as it carries the load as developed during the engagement of the mower operating systems. That is, the base of the U-shaped channel 42 mounts up against the pivoting control bail 24 or 30 so that the base of channel 42 receives a compression load from the control bail 24 or 30 while the control bail 24 or 30 is pivoted to engage the mower operating systems. FIGS. 10 and 11 more clearly show the U-shaped channel 42 in the bail pivot stop member 40. Bail pivot stops 40 are further located and retained by a hole 43 (see FIGS. 8 and 13) in the bail pivot stops 40 which are sized so as to fit snugly over the pivoting control bails 24 and 30. Cable 36, which connects the mower transmission 20 and the pivoting propulsion control bail 24, is anchored to the bail pivot stop 40, which is mounted on the pivoting propulsion control bail 24, by a hook like cable end 44 which hooks into bail pivot stop hole 46. Hook like cable end 44 is configured and sized relative to hole 46 in bail pivot stop 40 so that hook like cable end 44 fits tightly within hole 46, thus restricting any unwanted movement of the bail pivot stop 40 after it is snap fit onto the control bail 24. Bail pivot stop hole 46 is more clearly depicted in FIGS. 8 and 13. Cable 38, which connects the blade brake clutch 17 or the zone brake 19 to the pivoting blade brake control bail 30, is anchored to the bail pivot stop 40, which is mounted to the pivoting blade brake hole 46. hole 46. Hook like cable end 48 is configured and sized relative to hole 46 in bail pivot stop 40 so that hook like cable end 48 fits tightly within hole 46, thus restricting any unwanted movement of the bail pivot stop 40 after it is snap fit onto the control bail 30.

Bail pivot stop 40 is constructed of a nylon material which gives the bail pivot stop 40 a higher degree of resiliency than the steel pivoting control bails 24 and 30, thus enhancing the snap fit of the bail pivot stop 40 onto the pivoting control bails 24 and 30 as described above.

Figure 4:
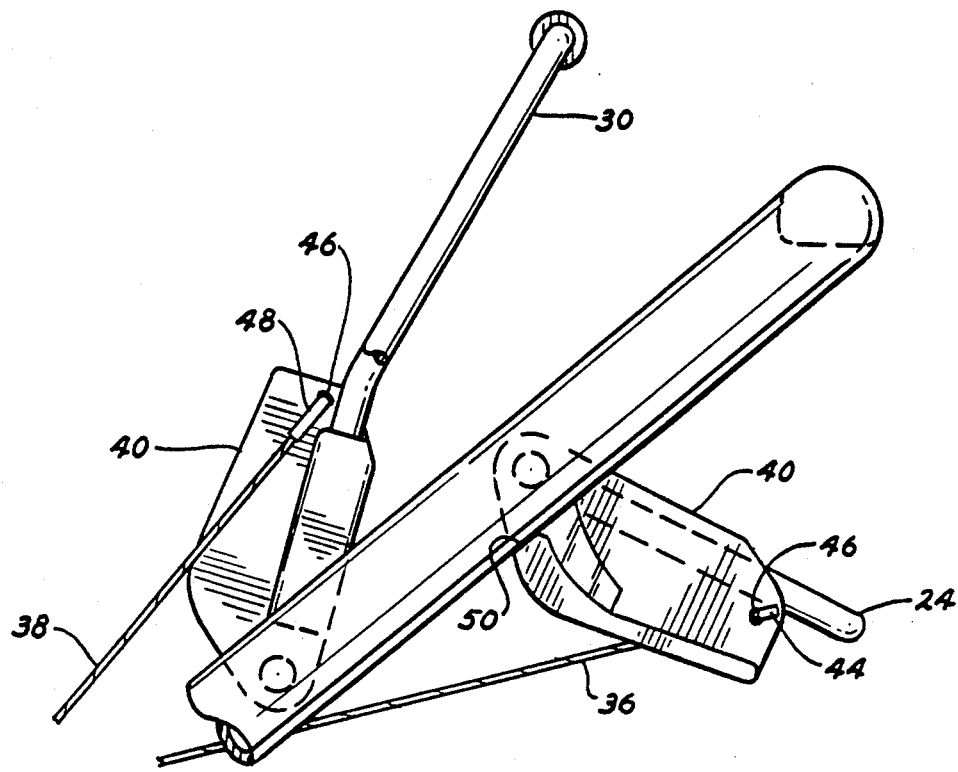
FIG. 4 is a partial left side elevational view of the handlebar assembly of the preferred lawn mower of FIG. 1.
Figure 5:
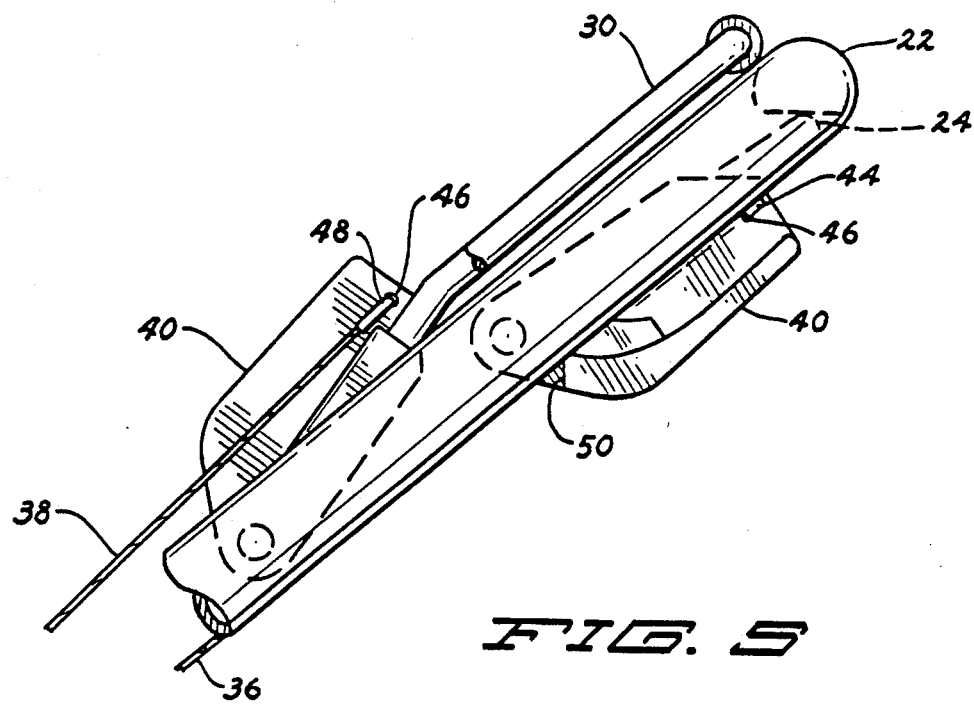
FIG. 5 is a partial left side elevational view of the handlebar assembly of the preferred lawn mower of FIG. 1.
Figure 6:
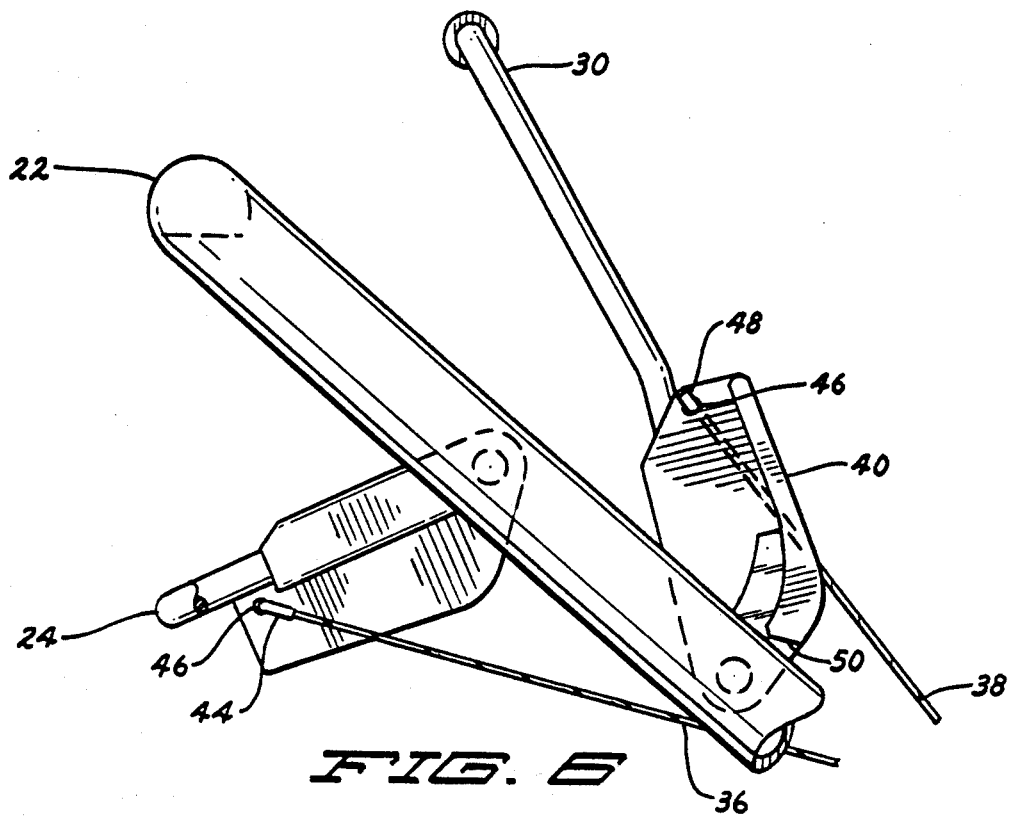
FIG. 6 is a partial right side elevational view of the handlebar assembly of the preferred lawn mower of FIG. 1.
Figure 7:
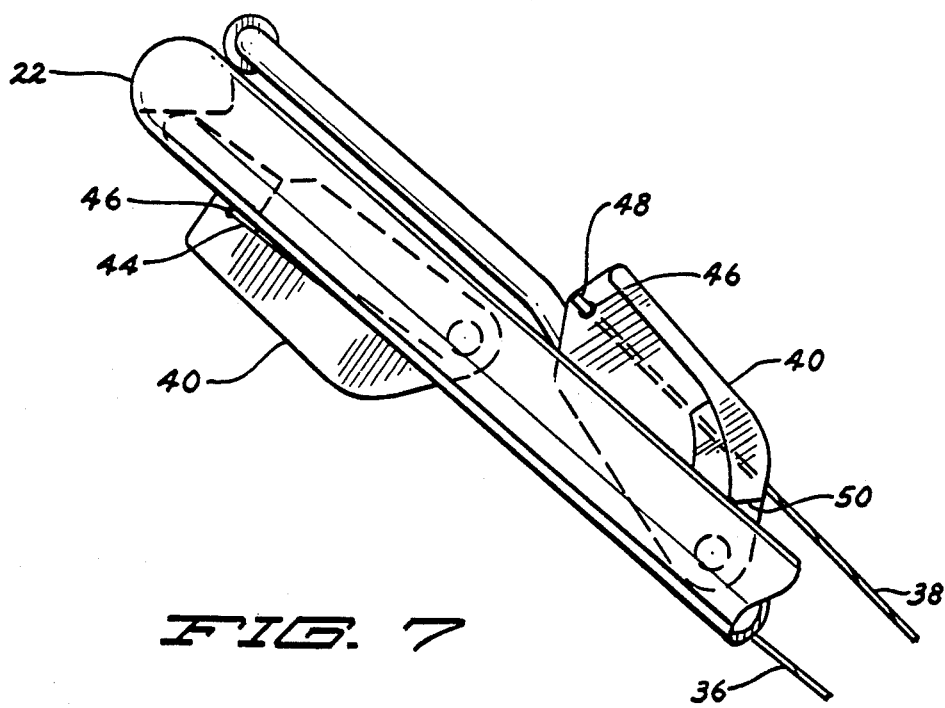
FIG. 7 is a partial side elevational view of the handlebar assembly of the preferred lawn mower of FIG. 1.
Figure 9:
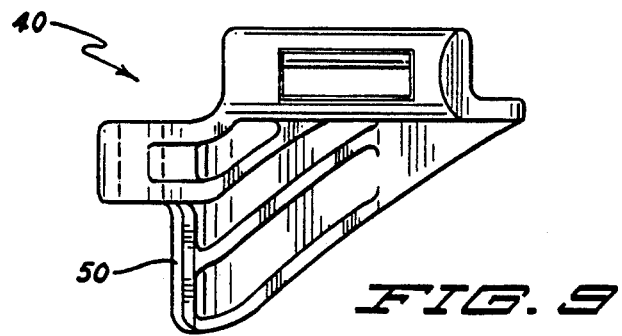
FIG. 9 is a top plan view of the preferred bail pivot stop and cable anchor of FIG. 8.

Operation of the preferred bail pivot stop and cable anchor system is as follows. FIGS. 4, 5, 6 and 7 show the pivoting control bails 24 and 30 in the various operating positions. FIG. 4 shows the pivoting control bails 24 and 30 in the disengaged positions wherein the mower transmission 20 is disengaged and the blade 16 is braked. FIG. 6 shows the pivoting control bails 24 and 30 in the position just before disengagement is complete and just before bail pivot stop 40 contact the handlebar 22. Once the operator has started the lawn mower engine 12, the operator can start the blade 16 rotation by rotating the pivoting blade brake control bail 30 back towards the handlebar 22. It must be noted that, on most walk behind lawn mowers incorporating a blade brake clutch, the pivoting blade brake clutch control bail will not rotate at all until an interlocking device (not shown) is tripped. The interlock is provided to prevent accidental engagement of the brake clutch by inadvertent movement of the pivoting blade brake clutch control bail. The interlock system is not disclosed in any detail in this description since it is not highly relevant to the claimed invention. As the pivoting blade brake control bail 30 is rotated, the cable 38 moves with the control bail 30 since the cable 38 is anchored to the bail 30 through the bail pivot stop 40 that is mounted on the control bail 30. The movement of cable 38 releases the brake in the blade brake clutch 17 and engages the clutch in the blade brake clutch 17 which allows the engine 12 to rotate the blade 16. The operator may then rotate the pivoting propulsion control bail 24 up towards the handlebar 22. As the pivoting propulsion control bail 24 is rotated, the cable 36 moves with the control bail 24 since the cable 36 is anchored to the bail 24 through the bail pivot stop 40 that is mounted on the control bail 24. The movement of the cable 36 engages the transmission 20 so that power is transmitted from the engine 12 to the wheels 18, thus causing propulsion of the lawn mower 10. FIGS. 5 and 7 show the pivoting control bail 24 and 30 in the engaged position wherein the mower transmission 20 is engaged, thus transmitting power from the engine 12 to the wheels 18, and the blade 16 is not braked and is being rotated by the engine 12.

Figure 14:
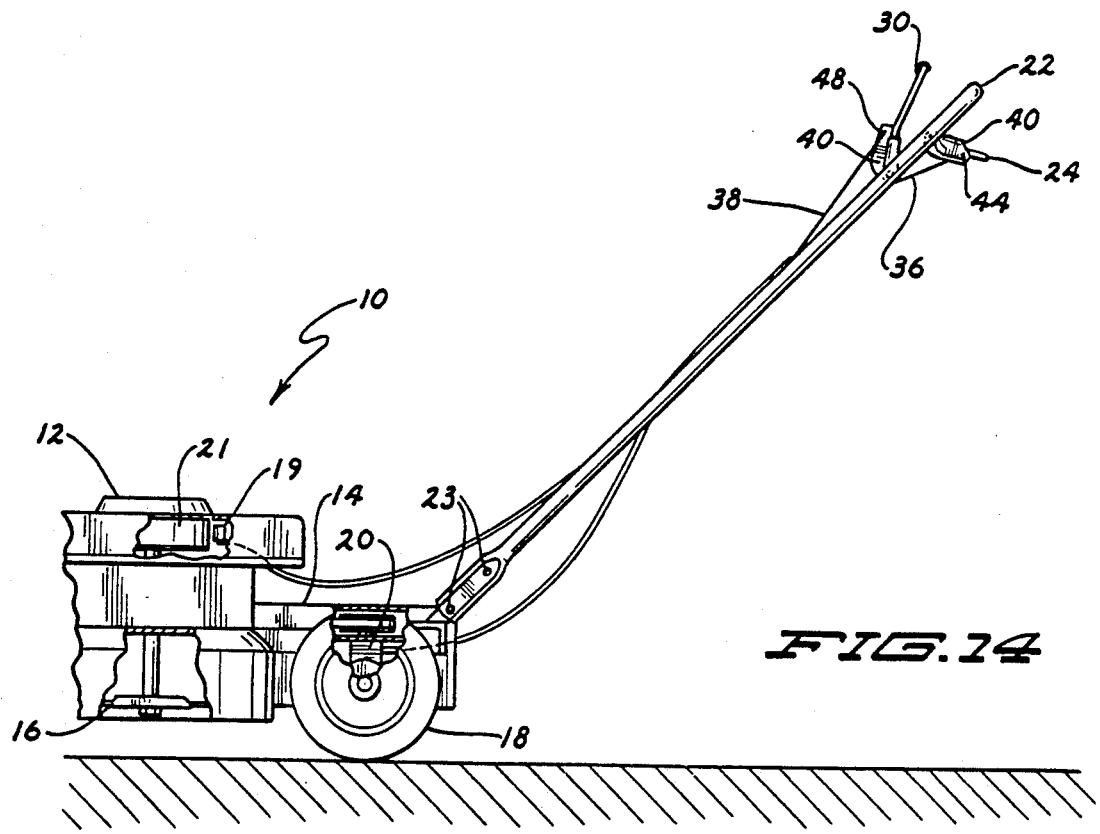
FIG. 14 is a side elevational view of a lawn mower with a blade brake pivoting control bail, a propulsion pivoting control bail, a zone brake, and a propulsion system according to the preferred embodiment of the present invention.

At this point, it must be noted that the lawn mower 10 might be equipped with a zone brake 19 as shown in FIG. 14 rather than a blade brake clutch 17 as shown in FIG. 1. If the mower 10 is equipped with a zone brake 19, the operator must rotate the pivoting blade brake control bail 30 back towards the handlebar 22 before starting the engine 12 since the zone brake 19 brakes on the engine 12 flywheel surface 21, preventing rotation of the crankshaft and the blade 16 which is bolted directly to the crankshaft. Once the engine 12 has started, the operator can then engage the mower propulsion pivoting control bail 24 up towards the handlebar 22 to engage the mower transmission 20 so as to propel the mower 10.

When the operator decides to stop the propulsion of the mower 10, he simply needs to release the pivoting propulsion control bail 24. Biasing means in the transmission 20 pulls the pivoting propulsion control bail 24, via the cable 36 and the bail pivot stop 40 that is attached to bail 24, back to a disengaged position as shown in FIG. 4. The biasing means in the transmission 20 continues to pull the pivoting control bail 24 towards the disengaged position until the stop surface 50 of the bail pivot stop 40, which is attached to the pivoting propulsion control bail 24, contacts the handlebar 22. When the stop surface 50 of the pivot bail stop 40, which is mounted to the pivoting propulsion control bail 24, contacts the handlebar 22, the disengagement of the mower transmission 20 is complete and propulsion of the mower 10 is stopped and the pivoting propulsion control bail is stopped from pivoting further away from the handlebar 22.

When the operator decides to stop the rotation of the blade 16, he simply needs to release the pivoting blade brake control bail 30. Biasing means in the blade brake clutch 17 pulls the pivoting blade brake control bail 30, via the cable 38 and the bail pivot stop 40 that is attached to the bail 30, back to a disengaged position as shown in FIG. 4. The biasing means in the blade brake clutch 17 continues to pull the pivoting control bail 30 towards the disengaged position until the stop surface 50 the pivoting control bail 30 towards the disengaged position until the stop surface 50 of the bail pivot stop 40, which is attached to the pivoting blade brake control bail 30, contacts the handlebar 22. FIG. 6 shows the pivoting blade brake control bail 30 in a position where the blade brake clutch 17 is almost completely disengaged and where the stop surface 50 is just about to contact the handlebar 22. When the stop surface 50 of the bail pivot stop 40, which is mounted on the pivoting blade brake control bail 30, contacts the handlebar 22, the disengagement of the blade brake clutch 17 is complete and the transmission of power from the engine 12 to the blade 16 is stopped and the blade 16 is braked.

If the mower 10 is equipped with a zone brake 19, the operator's releasing of the pivoting blade brake control bail 30 stops the engine 12 and the blade 16 from further rotation. Biasing means in the zone brake 19 pulls the pivoting blade brake control bail 30, via the cable 38 and the bail pivot stop 40 that is attached to the bail 30, back to a disengaged position as shown in FIG. 4. The biasing means in the zone brake 19 continues to pull the pivoting control bail 30 towards the disengaged position until the stop surface 50 of the bail pivot stop 40, which is attached to the pivoting blade brake control 30, contacts the handlebar 22. FIG. 6 shows the pivoting blade brake control bail 30 in a position where the zone brake 19 is almost completely activated and where the stop surface 50 is just about to contact the handlebar 22. When the stop surface 50 of the bail pivot stop 40, which is mounted on the pivoting blade brake control bail 30, contacts the handlebar 22, the activation of the zone brake 19 is complete and the engine flywheel 21, crankshaft and blade 16 are braked to a stop.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus, and method recited in the following claims, and equivalents thereof.

I claim:

1. In a walk behind mower, a mower operating system comprising:
   (a) a generally U-shaped handlebar;
   (b) a first generally U-shaped control bail having ends pivotally attached to said handlebar permitting said first control bail to pivot with respect to said handlebar;
   (c) a first bail pivot stop removably attached to one end of said first control bail;
   (d) a second, generally U-shaped control bail having ends pivotally attached to said handlebar permitting said second control bail to pivot with respect to said handlebar;
   (e) a second bail pivot stop removably attached to one end of said second control bail;
   wherein said first bail pivot stop and said second bail pivot stop are of substantially identical configuration and wherein said first bail pivot stop and said second bail pivot stop prevent said first control bail and said second control bail, respectively, from pivoting beyond a predetermined angle relative to said handlebar.

2. The operating system of claim 1, wherein said first control bail is pivotally biased upwardly and away from said handlebar and wherein said second control bail is pivotally biased downwardly and away from said handlebar.

3. The operating system of claim 2, wherein said first control bail is operatively connected to a blade brake, and said second control bail is operatively connected to a lawn mower propulsion system.

4. The operating system of claim 1, wherein said operating system further comprises means for operatively connecting said first bail pivot stop and said second bail pivot stop to control cables that engage and disengage a blade brake and a propulsion system, respectively.

5. The operating system of claim 1, wherein said first bail pivot stop and said second bail pivot stop each comprises a stop surface, a hole for receiving a control bail end, a hole for receiving a cable end, and a generally U-shaped channel for snappingly engaging said first control bail and said second control bail, respectively.

6. A walk behind lawn mower comprising:
   (a) a deck;
   (b) one or more wheels rotatably mounted on said deck, wherein said wheels support said deck;
   (c) a prime mover mounted on said deck;
   (d) a blade operatively connected to said prime mover;
   (e) a blade brake operatively connected to said blade;
   (f) a mower propulsion system operatively connecting said prime mover and said one or more wheels; and
   (g) an operating system comprising:
      (i) a generally U-shaped handlebar;
      (ii) a first generally U-shaped control bail with ends pivotally attached to said handlebar permitting said first control bail to pivot with respect to said handlebar;
      (iii) a first bail pivot stop removably attached to one end of said first control bail;
      (iv) a second, generally U-shaped control bail ends pivotally attached to said handlebar permitting said second control bail to pivot with respect to said handlebar;
      (v) a second bail pivot stop removably attached to one end of said second control bail;
   wherein said first bail pivot stop and said second bail pivot stop are of substantially identical configuration and wherein said first bail pivot stop and said second bail pivot stop prevent said first control bail and said second control bail, respectively, from pivoting beyond a predetermined angle relative to said handlebar.

* * * * *